United States Patent [19]

Hata et al.

[11] Patent Number: 4,831,405

[45] Date of Patent: May 16, 1989

[54] AUTO-FOCUS ARITHMETIC DEVICE

[75] Inventors: Daisuke Hata, Funabashi; Susumu Iguchi; Yoshimi Ohno, both of Kawasaki; Kazumasa Aoki, Tokyo; Takayuki Hatase, Yokohama, all of Japan

[73] Assignee: Ricoh Company, Ltd., Tokyo, Japan

[21] Appl. No.: 104,989

[22] Filed: Oct. 6, 1987

[30] Foreign Application Priority Data

Oct. 9, 1986 [JP] Japan .................. 61-240272

[51] Int. Cl.$^4$ .......... G03B 3/00; G03B 3/10
[52] U.S. Cl. ................ 354/409; 354/195.1; 354/402; 250/201
[58] Field of Search ........... 354/408, 409, 402–407, 354/195.1; 250/201, 201 AF, 201 PF, 204

[56] References Cited

U.S. PATENT DOCUMENTS

| | | | |
|---|---|---|---|
| 4,382,665 | 5/1983 | Eguchi et al. | 354/409 |
| 4,422,746 | 12/1983 | Meguro et al. | 354/409 X |
| 4,572,643 | 2/1986 | Akashi | 354/409 |
| 4,573,784 | 3/1986 | Suzuki | 354/408 X |

Primary Examiner—W. B. Perkey

Attorney, Agent, or Firm—Oblon, Fisher, Spivak, McClelland & Maier

[57] ABSTRACT

An auto-focus arithmetic device suitable for use in a photographic camera is provided. The device includes a photographic lens which is movable along a predetermined optical axis and a CCD for detecting light coming from a subject of interest through the lens. An arithmetic unit for determining the direction and amount of movement of the lens with respect to the subject of interest based on a detection signal from the CCD is provided. The arithmetic unit includes an integer portion calculating sub-unit for calculating an integer portion of the detection signal and a fractional portion calculating sub-unit for calculating a fractional portion of the detection signal. The fractional portion calculating sub-unit remains deactivated as long as the detected amount of discrepancy from the in-focus condition is larger than a predetermined level; however, it is activated when the detected amount of discrepancy becomes equal to or less than the predetermined level. In this manner, in accordance with the present invention, the integer and fractional portion calculating sub-units are used alternately.

5 Claims, 4 Drawing Sheets

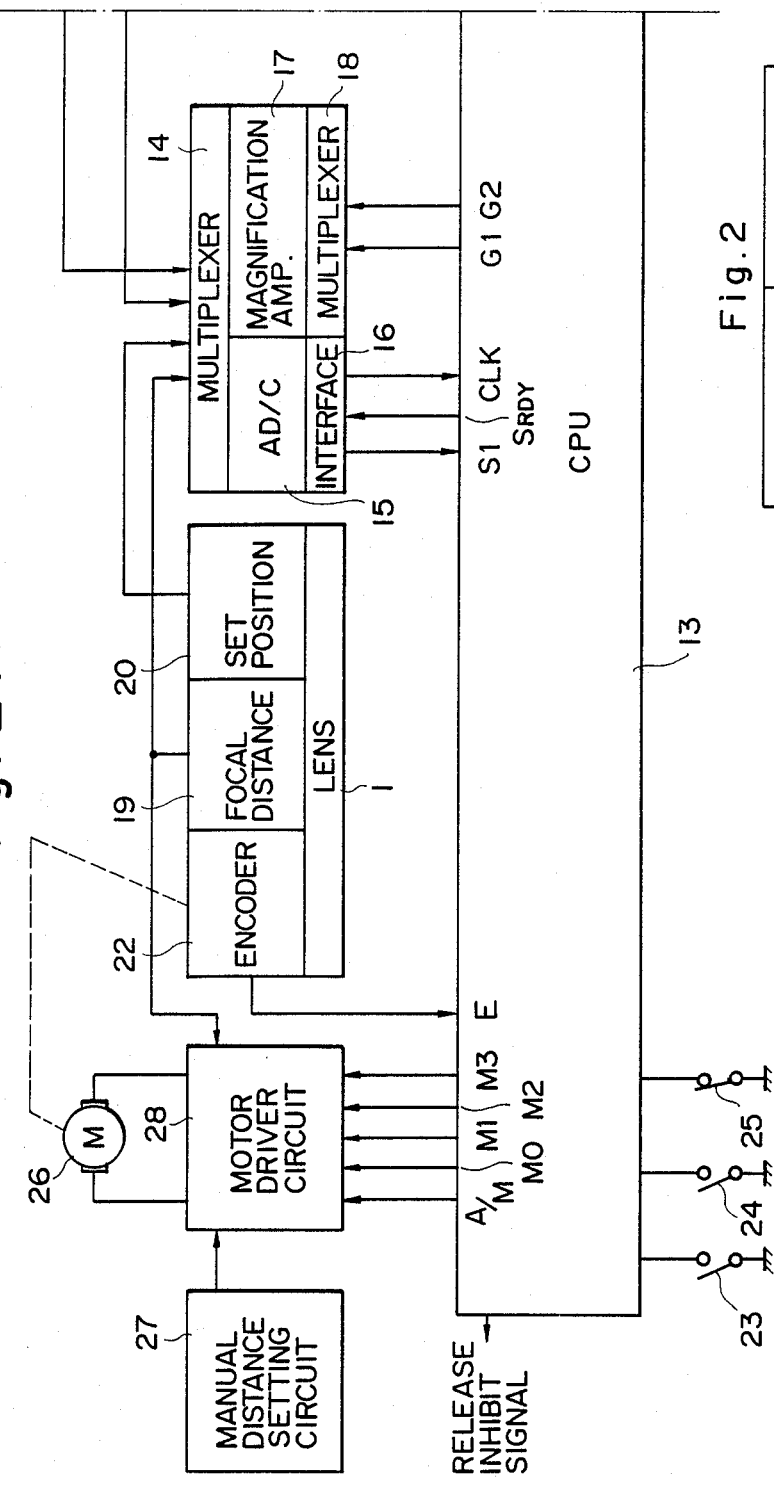

AUTO-FOCUS ARITHMETIC DEVICE

BACKGROUND OF THE INVENTION

1. Field of the Invention

This invention generally relates to an auto-focusing system, for example, for use in a photographic camera, and, in particular, to an auto-focus arithmetic device capable of carrying out a focus aid operation in the manual focusing mode.

2. Description of the Prior Art

Use is typically made of an auto-focus arithmetic device in an auto-focus camera and a camera provided with a manual focus aid display. In the conventional auto focus arithmetic device, the arithmetic operation to determine the amount of discrepancy from the in-focus condition is typically carried out as divide between an integer portion and a fractional portion. In this case, the arithmetic operations for the integer and fractional portions are carried out in parallel to thereby move a photographic lens automatically or manually until the lens is brought into the in-focus condition whereby the in-focus condition is indicated in the display. Thus, in the prior art auto-focus arithmetic device, even if the amount of discrepancy to the in-focus position is large, the fractional portion as well as the integer portion is being calculated, which tends to slow down the focus aid display operation during the manual focusing mode.

SUMMARY OF THE INVENTION

In accordance with the principle of the present invention, there is provided an auto-focus arithmetic device in which only the calculation of the integer portion is carried out as long as the amount of discrepancy to the in-focus condition is larger than a predetermined amount and the calculation of the fractional portion is carried out when the amount of discrepancy becomes equal to or smaller than the predetermined amount. With this structure, the focus aid display operation during the manual focusing mode can be carried out rapidly.

It is therefore a primary object of the present invention to obviate the disadvantages of the prior art as described above and to provide an improved auto-focus arithmetic device fast and accurate in operation.

Another object of the present invention is to provide an improved auto-focus arithmetic device suitable for us in a photographic camera.

A further object of the present invention is to provide an improved auto-focus arithmetic device capable of carrying out an auto aid display operation at an increased speed.

A still further object of the present invention is to provide an improved auto-focus arithmetic device simple in structure and thus inexpensive to implement.

Other objects, advantages and novel features of the present invention will become apparent from the following detailed description of the invention when considered in conjunction with the accompanying drawings.

BRIEF DESCRIPTION OF THE- DRAWINGS

FIG. 1 is a schematic illustration showing the overall structure of an auto-focus arithmetic device constructed in accordance with the principle of the present invention FIG. 2 is an illustration showing how to combine FIGS. 2A and 2B;

FIGS. 2A and 2B, when combined as shown in FIG. 2, define a schematic illustration showing the detailed structure of an auto-focus arithmetic device constructed in accordance with one embodiment of the present invention; and FIG. 3 is a flow chart showing a sequence of steps of a process which is implemented by the CPU 13 provided in the structure shown in FIGS. 2A and 2B.

DESCRIPTION OF THE PREFERRED EMBODIMENTS

Figure 1:
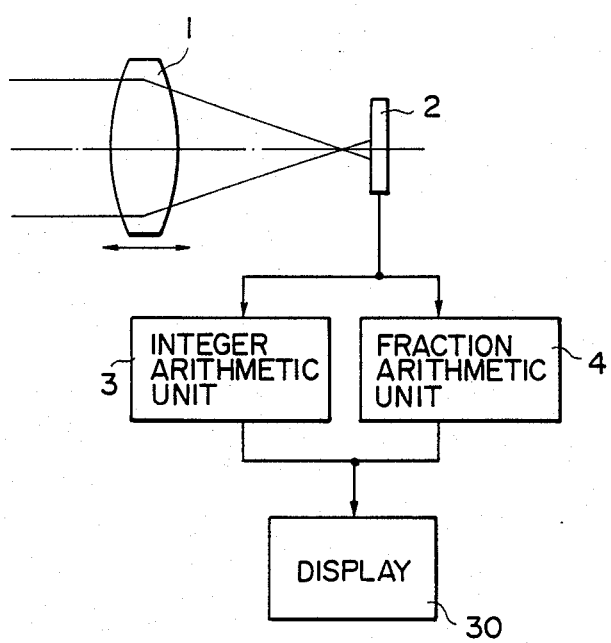

Referring now to FIG. 1, there is shown schematically a auto-focus arithmetic device constructed in accordance with the basic principle of the present invention. As shown, the present auto-focus arithmetic device includes a focusing lens 1, a detecting unit 2 for detecting the distribution of the light passing through the lens 1 from a subject of interest in a plane normal to the optical axis of the lens 1; an arithmetic unit including an integer arithmetic unit 3 and a fraction arithmetic unit 4 for determining the direction of movement and the amount of movement of a focusing optical system so as to bring the lens 1 in an in-focus condition in accordance with information supplied from the detecting unit 2; and display unit 30 for displaying an in-focus or out-of-focus condition based on the result determined by the arithmetic unit. In accordance with the principle of the present invention, the fraction arithmetic unit 4 is activated only when the result of the integer arithmetic unit 5 becomes within a predetermined range from the in-focus condition. That is, when the amount of discrepancy from the in-focus condition is larger than a predetermined amount, the fraction arithmetic unit 4 is maintained deactivated and only the integer arithmetic unit 3 is activated. And, as the amount of discrepancy to the in-focus condition becomes equal to or smaller than the predetermined amount, the fraction arithmetic unit 4 is activated.

Figure 2B:
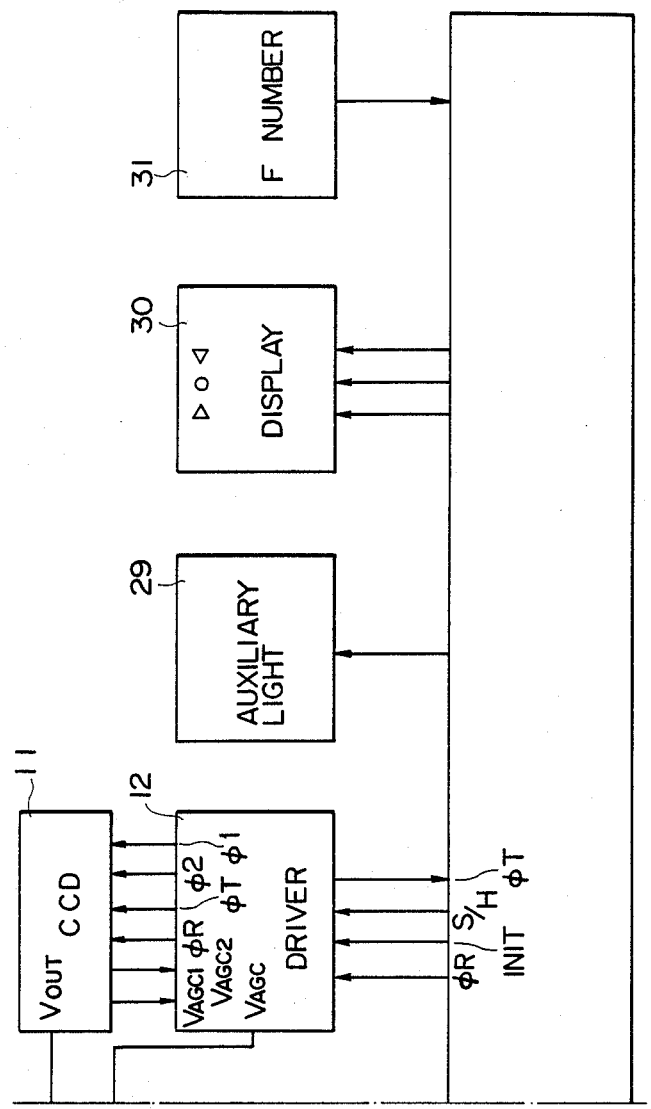

Referring now to FIGS. 2A and 2B, there is schematically shown an auto-focus arithmetic device constructed in accordance with one embodiment of the present invention. As shown, the present auto focus arithmetic device includes a charge coupled device or simply CCD 11 which constitutes part of the detecting unit 2 shown in the structure of FIG. 1. The light from a subject of interest passes through the photographic lens 1 and impinges on the CCD 11 after passing, for example, through an infrared light cut filter, a condenser lens, a pair of openings of a split stop member, and a pair of image-forming lenses. The CCD 11 is, for example, comprised of groups of photoelectric elements, such as paired two rows of photodiode arrays. In one example, the measurement of the distance to the subject of interest can be carried out using the correlation method in which the fact that the defocus amount of a photographic lens is proportional to the distance between a pair of images of the subject of interest formed on a light-receiving surface, such as the surface of the CCD 11, is utilized.

CCD 11 is driven by a driver 12 which is initialized by an initialization signal INIT supplied from an auto-focussing microcomputer or central processing unit, or simply CPU, 13. And, in response to a reset pulse $\phi R$ supplied from the CPU 13, the driver 12 supplies the reset pulse $\phi R$ to the CCD 11, and the driver also supplies transfer pulses $\phi 1$ and $\phi 2$ to the CCD 11. The CCD 11 includes a pair of monitoring photodiodes for detecting the light intensity of a subject of interest. Monitor signals $V_{AGC1}$ and $V_{AGC2}$, which go down at a speed in accordance with the light intensity of the subject of interest by the photocurrent from the photodiodes, are produced by a monitor circuit, and these monitor signals are reset to the initial values by the reset pulse $\phi R$. The driver 12 determines a difference between these monitor signals $V_{AGC1}$ and $V_{AGC2}$ and produces a shift pulse $\phi T$ when this difference has reached a predetermined level. The shift pulse $\phi T$ thus produced is supplied to the CCD 11 and also to the CPU 13. In addition, the driver 12 takes an absolute value of the difference between the monitor signals $V_{ASGC1}$ and $V_{AGC2}$. This absolute value is sampled and held by a sampling and holding signal S/H which is supplied from the CPU 13 after elapsing a predetermined time period from the initiation of integration of the CCD 11, whereby the contrast of the subject of interest is determined to output a contrast detection signal $V_{AGC}$.

The detection signal $V_{AGC}$ is supplied to an analog-to-digital converter (AD/C) 15 through a multiplexer 14, thereby being converted into a digital signal which is input into the CPU 13 through an interface 16. The CCD 11 is reset by the reset pulse $\phi R$ supplied from the driver 12 to thereby remove the accumulated charge, and, then, photocurrent is produced in the CCD 11 by the light from the subject of interest, so that charge becomes accumulated in the CCD 11 by the thus produced photocurrent in a pattern corresponding to the intensity distribution of the light from the subject of interest, i.e., integration being carried out. And, then, the CCD 11 has its shift gate caused to be open by the shift pulse $\phi T$ to thereby have the accumulated charge transferred to an analog shift register. Thus, the charge within the analog shift register is transferred one after another by transfer pulses $\phi 1$ and $\phi 2$ so that the charge is converted into a voltage to thereby output a video signal $V_{OUT}$. The video signal $V_{OUT}$ is supplied to a magnification amplifier 17 through a multiplexer 14, where the video signal $V_{OUT}$ is amplified, and, then, the thus amplified signal is converted into a digital signal by means of the analog-to-digital converter 15. Thus, the digital signal is input into the CPU 13 through the interface 16. Before receiving the video signal $V_{OUT}$, the CPU 13 adjusts the gain of the magnification amplifier 17 through the multiplexer 18 in accordance with the contrast detection signal $V_{AGC}$ from the driver 12. Thus, the video signal is suitably amplified by the magnification amplifier 17 at a rate corresponding to the contrast of the subject of interest before being input into the CPU 13, so that the distance measurement is carried out by using the thus amplified video signal.

On the other hand, the focal distance and the set position of the photographic lens 1 are detected by respective detectors 19 and 20, and these detection signals are input into the CPU 13 through the multiplexer 14, analog-to-digital converter 15 and interface 16. In addition, pulses from an encoder 22 and signals from switches 23 through 25 are also input into the CPU 13. The encoder 22 is in operative association with a photographic lens driving motor 26 and detects the rotation thereof. The switches 23 through 55 are manually operated and the switch 23 sets either the manual mode or automatic mode of focusing operation. The switch 24 is a power source switch comprised of a release switch which is turned on to cause an auto-focusing operation to proceed upon depression of a release button. The switch 25 sets an adjustment mode when turned on.

Also provided in the present device is a manual distance setting circuit 27 which produces a signal for rotating the motor 26 in the manual mode. When the automatic mode is set by the switch 23, under the control of the CPU 13, the motor 26 is driven to rotate by a motor driver circuit 28 in accordance with the calculated distance. On the other hand, when the manual mode is set by the switch 23, the motor 26 is driven to rotate by the motor driver circuit 28 in accordance with an output signal from the manual distance setting circuit 27.

If the subject of interest is relatively dark, the CPU 13 causes an auxiliary light source 29 to be turned on to apply light irradiation toward the subject of interest. The light reflecting from the subject of interest is received by the CCD 11 for use in an automatic focusing operation. In addition, the CPU 13 causes a display unit 30 to display an indication of one of in-focus, too close, too far and distance measurement impossible based on the result of calculation. Moreover, the CPU 13 receives the F number information of the photographic lens 1 in use from a F number unit 21. It is to be noted that the integer arithmetic unit 3 and the fraction arithmetic unit 4 shown in FIG. 1 are contained in an arithmetic unit (not shown) provided in the CPU 13.

Figure 3:
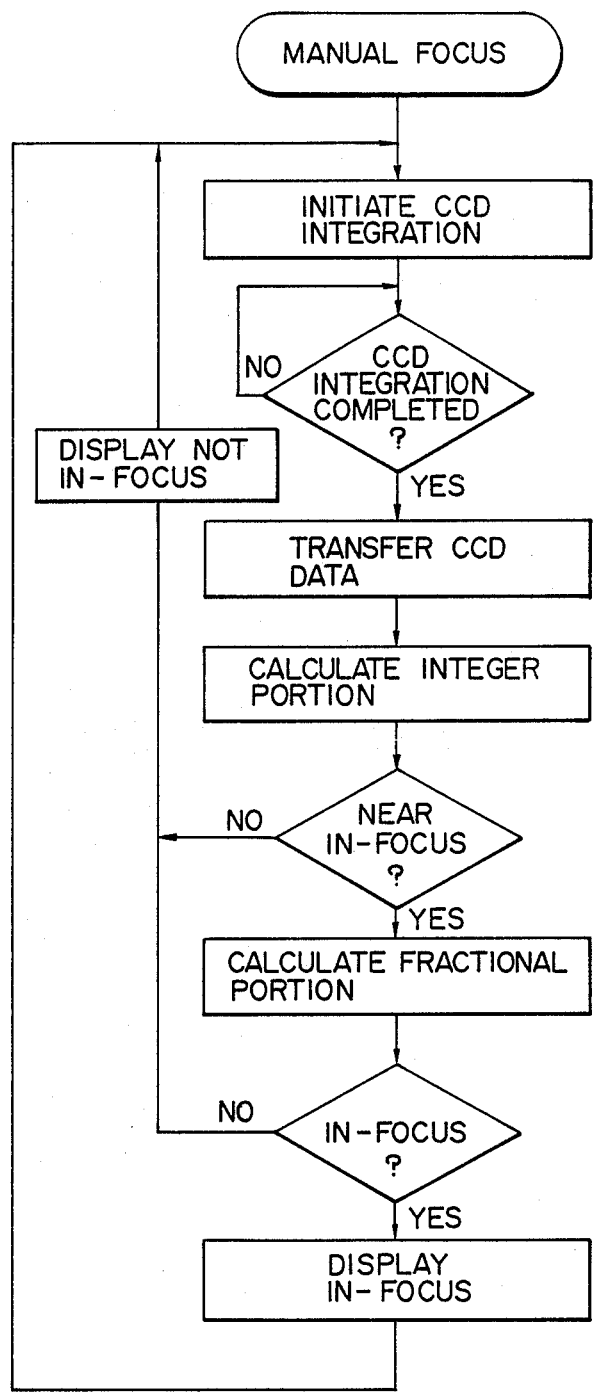

Now, with also referring to the flow chart of FIG. 3, the distance measurement routine of the above-described embodiment of the present invention will be described in detail below. It should be noted, however, that since the subject matter of the present invention resides in the focus aid display during the manual focusing mode, the distance measurement routine during the focus aid operation will be described.

In the manual focusing mode, in which the photographic lens 1 is operated manually, in the first place, the intergration of the CCD 11 is started, and upon completion of integration by the CCD 11, the data stored in the CCD 11 by the integration is transferred to the arithmetic unit in the CPU 13. The data signal thus transferred from the CCD 11 is first used at the integer arithmetic unit 3 where the calculation of the integer portion of the data signal is carried out to thereby determine whether it is close to the in-focus condition or not, for example, by comparing with a predetermined value. If it has been found that it is far away from the in-focus condition, then the out-of-focus condition is indicated in the display unit 30. As the focusing operation continues and when it has been found that it is close to the in-focus condition, for example, by comparing with the predetermined value, the fraction arithmetic unit 4 is activated to carry out the calculation of the fractional portion of the data signal. As a result of this arithmetic operation, it is determined whether or not the in-focus condition has been achieved, and, if not, the out-of-focus condition is indicated in the display unit 30. On the other hand, if it has been found that the in-focus condition has been achieved, then the in-focus condition is indicated in the display unit 30. In this manner, by moving the photographic lens 1 manually along the its optical axis until the in-focus condition is indicated in the display unit 30, the in-focus condition against the subject of interest can be obtained.

It is to be noted that the integer and fraction portions of a focusing signal can, for example, be determined using the pitch of the photodiode array of the CCD 11 as a reference. That is, as well known in the art, the photodiode array of the CCD 11 is comprised of a plurality of photodiodes arranged in a linear array as spaced apart from one another at a predetermined pitch. And, this pitch may be used as a reference to determine the integer and fraction portions of a focusing data signal. In other words, for example, that portion of the focusing data signal which is larger than the pitch of the photodiode array may be defined as the integer portion and that portion of the focusing data signal which is equal to or smaller than the pitch of the photodiode array may be defined as the fractional portion. The integer and fraction arithmetic units 3 and 4 may be formed by using any well known means, such as the one disclosed as the arithmetic means in the Japanese Patent Application No. 61-42851 assigned to the assignee of this application.

It should also be noted that the movement of a focusing optical system, such as the photographic lens 1, during the manual focusing mode, can be implemented by causing the motor 26 to be driven by a manual operation, or, alternatively, the focusing optical system, such as the photographic lens 1, can be moved manually directly.

As described above in detail, in accordance with the present invention, in the focus aid mode based on manual operation, the arithmetic calculations of the integer and fractional portions of a focusing signal are not carried out in parallel, but, instead, only the calculation of the integer portion of the focusing signal is carried out as long as the discrepancy to the in-focus condition is larger than a predetermined value. And, then, the fraction arithmetic unit is activated when the amount of discrepancy becomes equal to or smaller than the predetermined value, thereby starting the calculation of the fractional portion of the focusing signal. With this structure, the focus aid display can be carried out without delay, so that the in-focus condition can be achieved rapidly and accurately.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An auto-focus arithmetic device, comprising:
    an optical system movable along a predetermined path;
    detecting means for detecting light coming from a subject of interest through said optical system, said detecting means supplying a focusing signal indicating a current focusing condition of said optical system against said subject of interest, said detecting means including a CCD having a plurality of photoelectric elements arranged at a predetermined pitch;
    an arithmetic unit for determining a direction of movement and an amount of movement of said optical system with respect to said subject of interest along said predetermined path in accordance with said focusing signal, said arithmetic unit including integer portion calculating means for calculating an integer portion of said focusing signal and fractional portion calculating means for calculating a fractional portion of said focusing signal, said fractional portion calculating means being activated only when said focusing signal indicates that an amount of discrepancy form an in-focus condition is equal to or smaller than said predetermined pitch; and
    displaying means for displaying at least an in-focus condition or out-of focus condition depending on a result of calculation at said arithmetic unit.

2. The device of claim 1 wherein said optical system includes a photographic lens and said predetermined path is defined by an optical axis of said photographic lens.

3. The device of claim 1 further comprising moving means for moving said optical system.

4. The device of claim 3 wherein said moving means includes a motor operatively associated with said optical system, a motor driver and a manual distance setting circuit which is manually operated to set a distance over which the optical system is to be moved.

5. The device of claim 1 further comprising a CPU including a built-in arithmetic unit part of which defines said arithmetic unit.

* * * * *